United States Patent [19]
Gyugyi

[11] 3,875,494
[45] Apr. 1, 1975

[54] STATIC POWER CONVERSION ARRANGEMENT FOR CONVERTING DIRECT CURRENT POWER TO ALTERNATING CURRENT POWER

[75] Inventor: Laszlo Gyugyi, Pittsburgh, Pa.

[73] Assignee: Westinghouse Electric Corporation, Pittsburgh, Pa.

[22] Filed: July 18, 1973

[21] Appl. No.: 380,329

[52] U.S. Cl.................. 321/27 R, 307/82, 320/16, 321/5, 321/69 R
[51] Int. Cl............................................. H03M 7/52
[58] Field of Search............ 307/58, 82; 320/7, 16; 321/5, 27 R, 60, 69 R

[56] References Cited
UNITED STATES PATENTS

| | | | |
|---|---|---|---|
| 1,238,573 | 8/1917 | Rutherford | 320/16 X |
| 3,549,977 | 12/1970 | Watkins | 307/58 X |
| 3,742,336 | 6/1973 | Bedford | 321/5 X |

*Primary Examiner*—R. N. Envall, Jr.
*Attorney, Agent, or Firm*—J. J. Wood

[57] ABSTRACT

Direct current (DC) power is converted to alternating current (AC) power by a series combination of first DC to AC converter (inverter) and a cycloconverter connected in parallel with a second DC to AC converter (inverter). All three of the converters are naturally commutated. A commutation voltage for both the cycloconverter and the first inverter is provided by a reactive power source. To augment operation for some uses, the output of the cycloconverter is connected to an inductor, and the AC side of the first inverter is connected to neutral by a capacitor. The cycloconverter is controlled to maintain a near unity power factor.

7 Claims, 1 Drawing Figure

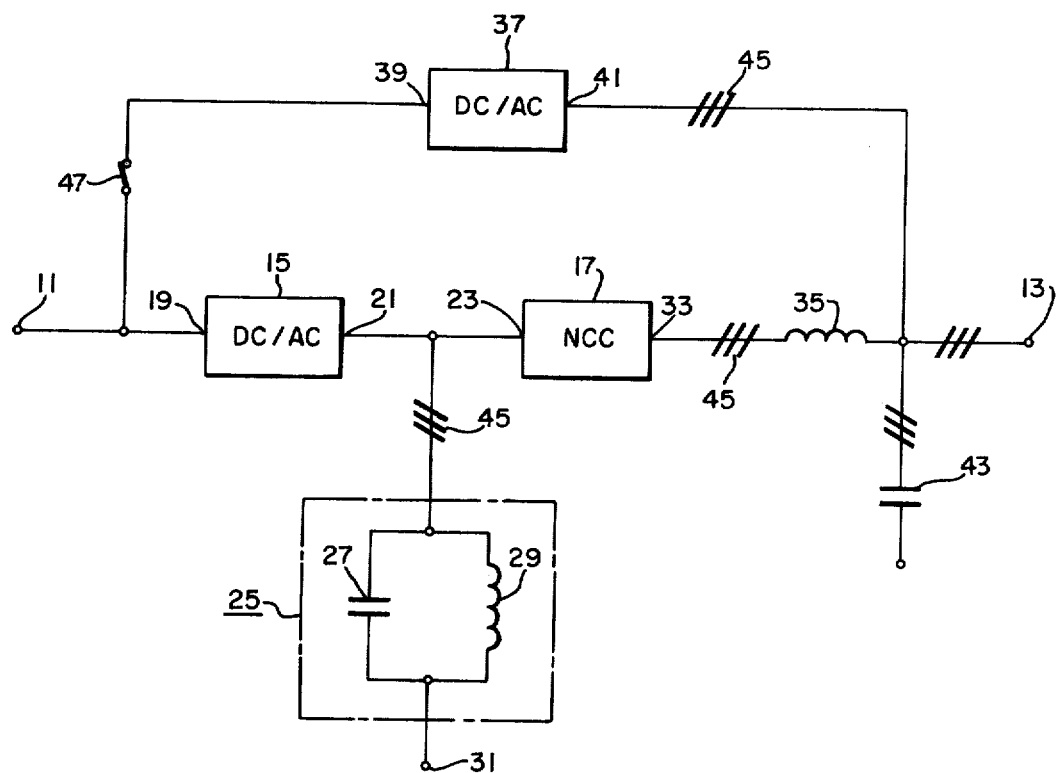

STATIC POWER CONVERSION ARRANGEMENT FOR CONVERTING DIRECT CURRENT POWER TO ALTERNATING CURRENT POWER

BACKGROUND OF THE INVENTION

1. Field of the Invention

This invention relates generally to the static conversion of electrical DC power to AC power, and more specifically, this invention relates to the utilization of naturally commutated converter circuits and a reactive power source to convert DC power to AC power.

2. Description of the Prior Art

There are many instances in which it is desirable to obtain utilizable alternating current (AC) power from a source that produces direct current (DC) power. These needs are extending into the large power areas, such as the provision of bulk electrical AC power for the electrical utilities from high power DC sources. Various static converter systems could be utilized for the conversion of DC to AC power. However, all of these systems are either line commutated and have to be operated into a "stiff" AC system i.e., an existing source of AC power in which the output voltage is substantially not affected by changes in load, such as the basic DC to AC converters, or they require forced commutation, such as the force commutated inverters. In addition, some of these systems cannot provide the AC electrical power at unity power factor.

While the forced commutated converter approach may be successfully utilized, force commutated converters are considerably more expensive than naturally commutated converters. Thus, it is desirable to provide a system which utilizes naturally commutated converters. However, naturally commutated converters require an AC input at the AC side in order to have an AC commutation voltage. Further, as a naturally commutated converter always draws a lagging power factor, the provision of AC power with an appropriate power factor becomes difficult in some circumstances. Therefore, it is desirable to combine the simplicity and low cost of a naturally commutated converter with the self-sufficiency and power factor control exhibited by a force commutated converter.

SUMMARY OF THE INVENTION

The present invention utilizes the desirable characteristics of naturally commutated converters, while still achieving self-sufficiency and power factor control. This is achieved by utilizing two parallel converting paths between a DC power input and an AC power output. In a first path, a naturally commutated converter and a naturally commutated cycloconverter are connected in series. The naturally commutated converter, of course, is operative to either convert AC power to DC power or to invert DC power to AC power. As the latter mode of operation is that primarily utilized in this invention, this converter will be referred to as a naturally commutated inverter. The DC side of this first inverter is connected to an input terminal, to which DC power may be applied. The AC side of the first inverter is connected to the input of the cycloconverter. A commutation voltage for the first inverter and the cycloconverter is provided by a reactive power source, such as a passive tuned circuit. This reactive power source need not supply any real power and has been termed a high frequency link generator, as described in detail in the copending application now abandoned of B. R. Pelly entitled "Static Conversion System Employing High Frequency Link," Ser. No. 349,884, filed Apr. 10, 1973 and also in U.S. Pat. No. 3,742,336 to Bedford for "Versatile Cycloinverter Power Converter Circuits." A second naturally commutated inverter has its DC side connected to the input terminal and its AC side connected to an output terminal, from which AC power may be derived. The AC side of this second inverter is also connected to the neutral or common of the system through a capacitor. Since the second inverter would not ordinarily have a commutating voltage unless the output terminal were connected to an AC power supply, it is necessary to provide a commutating voltage which is obtained from the cycloconverter through an inductor. Since the cycloconverter can provide a signal of any power factor at its output, the system can be utilized to provide AC power of any power factor at the output terminal.

It may be seen that with the arrangement of this invention all naturally commutated converters are utilized to convert DC power to AC power with a system which is self-sufficient (i.e., no external AC power supply is necessary) and which can provide an AC output power of any power factor, including unity. With appropriate setting of the first and second inverters and the cycloconverter, DC power at the input is inverted and provided as AC power at the output terminal of the system, subject only to minor losses in the converters and the high frequency link generator. The power at the output terminal is conveyed to a load (self-sufficient operation) or to AC power supply lines. In addition, for self-sufficient operation, the output of the cycloconverter is utilized to commutate the second inverter, and thus provide the parallel path for power flow and inversion from the input terminal to the output terminal without connecting the second inverter to a "stiff" AC supply.

The foregoing and other objects, advantages and features of this invention will hereinafter appear, and for purposes of illustration, but not of limitation, an exemplary embodiment of the subject invention is shown in the appended drawing.

BRIEF DESCRIPTION OF THE DRAWING

The sole FIGURE of this drawing is a schematic functional circuit diagram illustrating a preferred embodiment of the DC to AC power converting arrangement of the present invention.

DETAILED DESCRIPTION OF THE PREFERRED EMBODIMENT

In the sole FIGURE of this drawing, there is shown an arrangement for converting an electrical DC power signal applied to an input terminal 11 to an electrical AC power signal on an output terminal 13. For operation of the system, any appropriate DC power source may be connected to the input terminal 11. The AC signal on output terminal 13 may be connected to an appropriate load or AC power supply lines. For purposes of describing this preferred embodiment, it will be assumed that the AC signal on output terminal 13 has a frequency of 60 Hz, although it should be recognized that the invention is not limited to the production of a signal of this frequency. Also, in order to describe the ratings of various circuit components, and to explain the distribution of power in the system, reference will be made to a "unit" of power at output terminal 13.

Thus, the ratings of the various circuit components will be expressed in terms of "per unit" (P.U.) of power at output terminal 13.

In the arrangement of the present invention, there are two parallel paths between the input terminal 11 and output terminal 13. In a first of these paths, a naturally commutated converter 15 and a naturally commutated cycloconverter 17 are connected in series. The naturally commutated converter 15 is utilized in the inversion mode (i.e., conversion of DC to AC) in this system, and hence will hereinafter be referred to as a first naturally commutated inverter. Inverter 15 and cycloconverter 17 are essentially conventional circuits utilizing controllable electrical elements, such as thyristors, examples of which are described in detail in the text of B. R. Pelly, entitled "Thyristor Phase-Controlled Converters and Cycloconverters," published by Wiley-Interscience division of John Wiley & Sons, Inc. in 1971.

Naturally commutated inverter 15 has its DC side 19 connected to the input terminal 11, while the AC side 21 is connected to input 23 of cycloconverter 17. A commutating voltage for AC side 21 of inverter 15 and input 23 of cycloconverter 17 is provided by a reactive power source 25. Since the source 25 need not supply any real power, only reactive power, it may be a passive source such as the tuned circuit comprising capacitor 27 and inductor 29 illustrated in the drawing. The other side of the tuned circuit is connected to the neutral or common (also known as the AC ground) 31 of the system. In this particular example, it has been found desirable to arrange the tuned circuit of capacitor 27 and inductor 29 to resonate at approximately 360 Hz, although any frequency high with respect to the 60 Hz signal on output terminal 13 would be suitable.

Inverter 15 is rated for one-half P.U. and cycloconverter 17 is rated for two-thirds P.U. (As all the ratings referred to herein, the ratings of inverter 15 and cycloconverter 17 are merely suggested values for the particular embodiment disclosed and may be varied as required for other uses.) Inverter 15 is arranged to convey from input terminal 11 the real power (watts) required at input 23 of cycloconverter 17. Cycloconverter 17 is arranged to pass the real power received at input terminal 23 to the output terminal 13, and to generate the reactive power (vars) demanded by the load at the output terminal 13. Thus, by appropriate arrangement of inverter 15 and cycloconverter 17, the desired power at output terminal 13 may be conveyed from input terminal 11 with the output power factor maintained at unity. Since the reactive power source (or high frequency link generator) 25 cannot provide real power, all of the power required at output terminal 13 must be conveyed through inverter 15 and cycloconverter 17. Of course, the DC source connected to input terminal 11 must also provide power for the losses incurred in inverter 15, cycloconverter 17 and reactive power source 25, but these losses are relatively minor compared to the throughput power. The reactive power source 25 does provide the lagging reactive power required by inverter 15 and cycloconverter 17. In this preferred embodiment, inverter 15 is operated with a fixed (and nearly 180°) firing angle, so that the link voltage of the tuned circuit will follow variations of the DC supply connected to the input terminal 11. With this arrangement, the input power factor of inverter 15, as seen by the reactive power source 25 (i.e., at the AC side of converter 15), is nearly unity, so that the tuned circuit of reactive power source 25 primarily produces the lagging reactive power required by cycloconverter 17.

An inductor 35 is connected from output 33 of cycloconverter 17 to the output terminal 13. When the system is operated in the self-sufficient mode, inductor 35 primarily serves as a reactive filter. However, when output terminal 13 is connected to an AC supply line, inductor 35 is utilized in adjustment of the output power factor of cycloconverter 17 to maintain the output power factor of the system disclosed herein at unity. Although the present instance involves a transfer of real power as well as reactive power, this type of control of the reactive power exchange is illustrated and discussed in detail in the copending application of Laszlo Gyugyi entitled "Static Power Conversion Arrangement and Method," Ser. No. 380,328, filed on July 18, 1973 and assigned to the same assignee as the present invention.

A second naturally commutated converter (also utilized in the inverter mode and hereinafter referred to as a naturally commutated inverter) 37 is connected between input terminal 11 and output terminal 13. The DC side 39 of inverter 37 is connected to input terminal 11, while the AC side 41 of inverter 37 is connected to the output terminal 13. Inverter 37 is a conventional converter adapted to invert a DC power signal on terminal 11 to a 60 Hz AC power signal on terminal 13. This inverter 37 is rated for one-half P.U. and the power output thereof, when combined with the power output of cycloconverter 17, produces the desired power at output terminal 13. In order to "stiffen" the voltage on output terminal 13, which is utilized to commutate inverter 37, a capacitor 43 is connected from the AC side of inverter 37 to neutral 31. This capacitor is rated for one third P.U.

Although the arrangement as shown is primarily single phase, it should be noted that the arrangement would probably have its primary utility in a three phase network. This type of arrangement is schematically indicated by the lines 45.

In order to further understand the present invention, the operation of the arrangement will be described for both the self-sufficient mode and for the mode when the system is tied into an active AC network. Taking first the case of self-sufficient operation (i.e., when the arrangement disclosed herein is the only source of power for a load), it will be assumed that the switch 47 is initially opened. Of course, the switch 47 is primarily a schematic illustration of the operation, and the more usual approach would be just to not operate the thyristors of inverter 37 initially. With switch 47 open, the D.C. to A.C. power generating system is reduced essentially to D.C. to A.C. converter 15, reactive power source 25 and cycloconverter 17. The first step is to operate inverter 15 in order to energize the passive resonant LC tuned circuit 25 (the cycloconverter 17 is idle at this time as it does not have an input voltage due to the fact that no power is stored in the tuned circuit 25 at this point). Thus, the inverter 15 functions as a conventional line or naturally commutated inverter, similar to those used in induction heating systems. That is to say, the converter absorbs DC power and delivers AC power for the resonant tank circuit to replenish its losses. The operation and control of this type of inverter (i.e., one having a resonant LCR load) is described in detail in the paper entitled "Latest Developments in Static High Frequency Power Sources for Induction Heating" B. R. Pelly, IEEE Transactions on Industrial Electronics and Control Instrumentation Volume IECI-17 number 4, pages 297,312 June 1970. After inverter 15 has energized the tuned circuit 25 to establish a commutating voltage, the naturally commutated cycloconverter 17 is actuated to convert the AC power obtained from inverter 15 at the link frequency (approximately 360 Hz in this example) to AC output power of fixed voltage having a frequency of 60 Hz. At this stage, inductor 35 and capacitor 43 are not important and primarily serve to provide a filtering function.

The combination of inverter 15, a passive tuned circuit 25 and cycloconverter 17 is clearly self-sufficient. Real AC power is provided at the output 33 of cycloconverter 17. This real power is absorbed from the passive link circuit 25. Of course, the tuned circuit of high frequency link 25 cannot supply real power, so the real power must come from the DC source connected to terminal 11 via inverter 15. Thus, at input 23 of cycloconverter 17 the high frequency link 25 and the inverter 15 appear as an equivalent AC source of real power at the link frequency. On the other hand, the high frequency link 25 and cycloconverter 17 represent a loaded resonant tank circuit (LCR) for inverter 15. By controlling inverter 15 so as to maintain the voltage of the LC tank circuit of reactive power source 25 at the magnitude to which it has been initially energized, the inverter 15 will supply the exact amount of real power that is absorbed by cycloconverter 17 at its input 23. With this established condition, the voltage of the high frequency link 25 is maintained, real power flows from the DC source connected to input terminal 11 to the 60 Hz AC output on output terminal 13, and the self-sufficient operation of the system is insured.

After the 60 Hz output voltage has been established by cycloconverter 17, the inverter 37 may be energized by closing switch 47. Inverter 37 is operated in the conventional manner with its controlled elements (such as thyristors) being commutated from the 60 Hz voltage on output terminal 13, which is "stiffened" by capacitor 43 in contrast to inverter 15 which is commutated from the LC tank circuit voltage of higher frequency (360 Hz). It is pointed out here that no synchronization between the firing of the thyristors of inverter 15, 37 and cycloconverter 17 is needed. In fact, the three conversion equipments, i.e., inverter 15, inverter 37 and cycloconverter 17, are basically controlled independently of each other, any one unit "not knowing" that the other two conversion equipments contribute to the final output. For example, inverter 15 is simply controlled, in the conventional manner to supply enough power just to maintain a constant voltage across LC tank circuit 25. Cycloconverter 17 thus "sees" inverter 15 with LC tank circuit 25 as a constant AC voltage generator; therefore, cycloconverter 17 can again be controlled by conventional techniques to provide the output power at the desired AC voltage. Similarly, when switch 47 is closed, inverter 37 is connected between an AC source, produced by the cycloconverter at output terminal 13, and a DC supply provided at input terminal 11. Thus inverter 37 can also be controlled by established techniques as an independent entity to produce the required AC output power (in the present case, one-half P.U.) from the DC input. By controlling the firing angles of the thyristors of inverter 37 in conventional manner, it can provide real AC output power at 60 Hz which is absorbed from the DC source connected to input terminal 11.

Suitable firing angle control circuits for example that can be utilized are described in "Thyristor Phase Controlled Converters and Cycloconverters" by B. R. Pelly John Wiley & Sons 1971.

The AC output of inverter 37 has a lagging power factor, as in the case of all naturally commutated converters, which is compensated (generally overcompensated) by capacitor 43. The actual power factor at output terminal 13 is thus determined by the load power factor, the input power factor of inverter 37 (i.e., the power factor at the AC side 41) and capacitor 43. As a result, this output power factor may be either lagging or leading. This is, however, of no consequence to the operation of this system because the cycloconverter can operate with both lagging and leading power factor loads. Therefore, the operation of the static power conversion arrangement disclosed herein may be maintained in a self-sufficient manner for all types of loading conditions. As a result, an inexpensive self-sufficient system of high technical performance is obtained for the conversion of DC power to AC power. In essence, this is achieved by the utilization of two parallel paths, one path having an inexpensive conventional naturally commutated inverter 37, while the other path includes the inverter 15 and cycloconverter 17 to maintain the output voltage and provide reactive power for commutation of inverter 37.

When the static power conversion arrangement disclosed herein is connected into an active AC network, the operation is essentially that previously described. There is, however, an important difference in that when output terminal 13 is connected to an AC supply line, cycloconverter 17 is controlled to maintain the output power factor of the system at unity. In other words, there is a throughput of real power from the DC source connected to input terminal 11, but the arrangement also serves as a source of reactive power for the AC supply lines. Such a function can be performed as a result of the capability of cycloconverter 17 to provide both lagging and leading output power factors. When the output 33 of cycloconverter 17 is connected to an active AC power supply at terminal 13 by an inductor 35, the reactive power exchange between cycloconverter 17 and the AC supply at terminal 13 may be controlled by appropriately adjusting the amplitude and phase of the output voltage of cycloconverter 17 as described in the references cited supra. (In essence, cycloconverter 17 in this mode of operation actually functions in the same fashion as a synchronous generator.) Since the output power factor at terminal 13 is determined by the lagging reactive power demand of inverter 37, the fixed leading power factor of the current drawn by capacitor 43, and the variable (lagging or leading) reactive output current of cycloconverter 17, it is evident that by appropriate control of cycloconverter 17 the power factor of the static power converting system shown and described herein may be maintained at unity under all normal operating conditions.

It should be understood that various modifications, changes and variations may be made in the arrangements, operations and details of construction of the elements disclosed herein without departing from the spirit and scope of the present invention.

I claim:

1. A static power conversion arrangement for converting DC power to AC power comprising:
   a first naturally commutated inverter adjusted to convey power from the DC side to the AC side thereof and having the DC side connected to the input of the arrangement;
   a naturally commutated cycloconverter having the input thereof connected to the AC side of said first naturally commutated inverter and adjusted to convey power from the AC side of said first inverter to the output of said cycloconverter;
   a reactive power source connected to the AC side of said first inverter and to the input of said cycloconverter, said source providing the voltage for commutation of said first inverter and said cycloconverter; and
   a second naturally commutated inverter adjusted to convey power from the DC side to the AC side thereof and having the DC side thereof connected to the DC side of said first inverter and the AC side thereof connected to the output of said cycloconverter, the AC signal at the output of said cycloconverter providing the commutation voltage for said second inverter, and the AC side of said second inverter being connected to the output of the arrangement.

2. A static power conversion arrangement as claimed in claim 1 wherein:
   said first inverter and said second inverter are each rated for one half per unit of power provided at the output of the arrangement; and
   said cycloconverter is rated for two thirds per unit of power provided at the output of the arrangement.

3. A static power conversion arrangement as claimed in claim 1 wherein said reactive power source is a passive tuned circuit.

4. A static power conversion arrangement as claimed in claim 1 and further comprising an inductor connected between the output of said cycloconverter and the output of the arrangement.

5. A static power conversion arrangement as claimed in claim 1 and further comprising a capacitor connected from the AC side of said second inverter to neutral.

6. A static power conversion arrangement as claimed in claim 1 wherein:
   the alternating current signal at the AC side of said second inverter and the output of said cycloconverter has a frequency of 60 Hz; and
   said reactive power source provides a signal having a frequency of approximately 360 Hz to the AC side of said first inverter and the input of said cycloconverter.

7. A static power conversion arrangement for converting DC power to AC power comprising:
   an input terminal to which a DC signal may be applied;
   an output terminal from which an AC signal may be obtained;
   a first naturally commutated inverter having the DC side thereof connected to said input terminal and adjusted to convey power from the DC side to the AC side thereof;
   a naturally commutated cycloconverter having the input thereof connected to the AC side of said first inverter and adjusted to convey the power at the AC side of said first inverter to its output;
   an inductive-capacitive tuned circuit connected to the AC side of said first inverter and the input of said cycloconverter, said tuned circuit providing a commutating voltage to both said first inverter and said cycloconverter at a frequency high relative to the frequency of signal at the output of said cycloconverter;
   an inductor connected between the output of said cycloconverter and said output terminal;
   a second naturally commutated inverter having the DC side thereof connected to said input terminal and the AC side thereof connected to said output terminal, said second inverter being adjusted to convey power from the DC side to the AC side thereof, the signal at the output of said cycloconverter providing a commutation voltage for said second inverter; and
   a capacitor connected from the AC side of said second inverter to neutral.

* * * * *